United States Patent [19]

Hartke

[11] 4,391,490
[45] Jul. 5, 1983

[54] INTERFACE FOR PROXIMITY COUPLED ELECTRO-OPTIC DEVICES

[75] Inventor: David H. Hartke, Los Angeles, Calif.

[73] Assignee: Xerox Corporation, Stamford, Conn.

[21] Appl. No.: 250,478

[22] Filed: Apr. 2, 1981

[51] Int. Cl.³ .............................................. G02F 1/03
[52] U.S. Cl. ................................................... 350/356
[58] Field of Search ........................................ 350/356

[56] References Cited

U.S. PATENT DOCUMENTS

| | | | |
|---|---|---|---|
| 3,958,862 | 5/1976 | Scibor-Rylski | 350/356 |
| 4,125,318 | 11/1978 | Scibor-Rylski | 350/356 |
| 4,281,904 | 8/1981 | Sprague et al. | 350/356 |

Primary Examiner—William L. Sikes
Assistant Examiner—Léon Scott, Jr.

[57] ABSTRACT

A proximity coupled electro-optic device in which the electro-optic element has a pattern of conductors applied to the surface thereof abutting the individually addressable electrodes applying encoded data samples. The conductors are aligned in the same, or substantially the same, direction as the electrodes, and the period of the conductor pattern is equal to or less than the maximum width of the electrodes. Directional alignment tolerances between the conductors and electrodes are increased as the period of the conductor pattern is decreased, and when the conductors are segmented.

6 Claims, 10 Drawing Figures

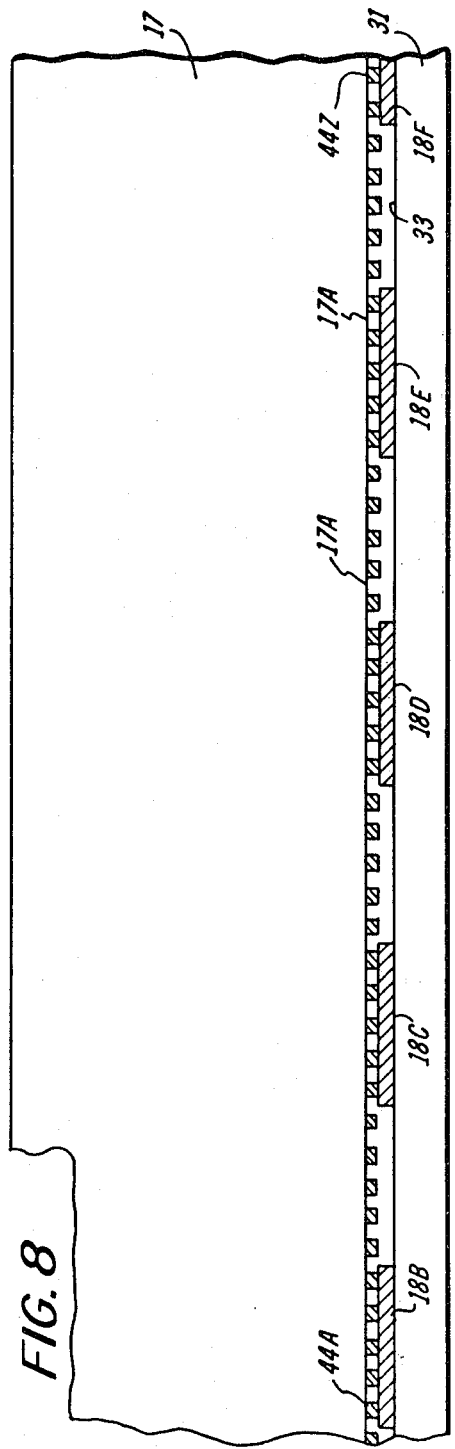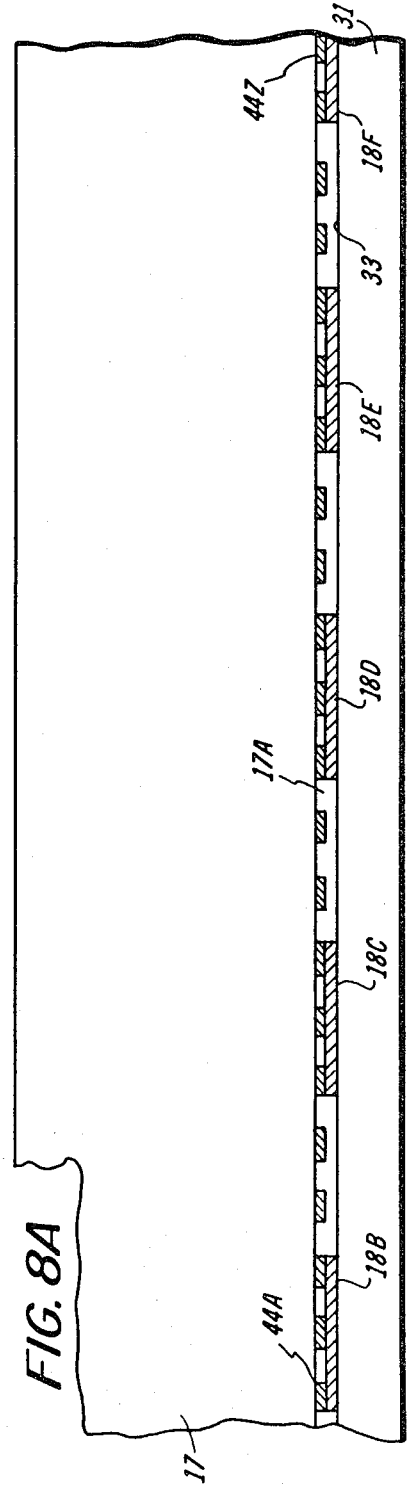

INTERFACE FOR PROXIMITY COUPLED ELECTRO-OPTIC DEVICES

This invention relates to electro-optic devices and, more particularly, to proximity coupled light valves for electro-optic line printers and the like.

It has been shown that an electro-optic element having a plurality of individually addressable electrodes can be used as a multi-gate light valve for line printing. See, for example, U.S. Pat. No. 4,281,904 on a "TIR Electro-Optic Modulator with Individually Addressed Electrodes." Also see "Light Gates Give Data Recorder Improved Hardcopy Resolution," *Electronic Design*, July 19, 1979, pp. 31–32; "Polarizing Filters Plot Analog Waveforms," *Machine Design*, Vol. 51, No. 17, July 26, 1979, p. 62; and "Data Recorder Eliminates Problem of Linearity," *Design News*, Feb. 4, 1980, pp. 56–57.

As is known, almost any optically transparent electro-optical material can be used as the electro-optic element of such a light valve. The most promising materials now appear to be $LiNbO_3$ and $LiTaO_3$, but there are other materials which qualify for consideration, including BSN, KDP, $KD^xP$, $Ba_2NaNb_5O_{15}$ and PLZT. In any event, it is desirable that the electrodes of such a light valve be intimately coupled to the electro-optic element and distributed in non-overlapping relationship widthwise of the electro-optic element (i.e., orthogonally relative to its optical axis), typically on equidistantly separated centers so that there is a generally uniform interelectrode gap spacing. A copending and commonly assigned United States patent application of W. D. Turner, which was filed Sept. 17, 1980 under Ser. No. 187,936 on "Proximity Coupled Electro-Optic Devices", shows that the electrodes of an electro-optic device, such as a multi-gate light valve, may be fabricated on a suitable substrate and pressed against or held very close to the electro-optic element to provide what is referred to as "proximity coupling".

To perform line printing with a multi-gate light valve of the foregoing type, a photosensitive recording medium, such as a xerographic photoreceptor, is exposed in an image configuration as it advances in a cross line direction (i.e., a line pitch direction) relative to the light valve. More particularly, to carry out the exposure process, a sheet-like collimated light beam is transmitted through the electro-optic element of the light valve, either along its optical axis for straight through transmission or at a slight angle relative to that axis for total internal reflection. Furthermore, successive sets of digital bits or analog signal samples (hereinafter collectively referred to as "data samples"), which represent respective collections of picture elements or pixels for successive lines of the image, are sequentially applied to the electrodes. As a result, localized electric bulk or fringe fields are created within the electro-optic element in the immediate vicinity of any electrodes to which non-reference level data samples are applied. These fields, in turn, cause localized variations in the refractive index of the electro-optic element within an interaction region (i.e., a light beam illuminated region of the electro-optic element which is subject to being penetrated by the electric fields). Thus, the phase front or polarization of the light beam is modulated (hereinafter generically referred to as "p-modulation" of the light beam) in accordance with the data samples applied to the electrodes as the light beam passes through the interaction region. Schlieren readout optics may be used to convert a phase front modulated light beam into a light beam having a correspondingly modulated intensity profile. For example, the phase front modulated light beam may be imaged onto the recording medium by central dark field or central bright field imaging optics. Alternatively, if the input light beam is polarized, a polarization modulation to intensity modulation conversion process may be performed by passing the polarization modulated output beam through a polarization analyzer. In more generic terms, the p-modulation of the light beam is converted into a correspondingly modulated intensity profile by using "p-sensitive readout optics" to image or project (hereinafter collectively referred to as imaging) the light beam onto the recording medium.

Although the electrodes of a proximity coupled electro-optic device are clamped against the electro-optic element thereof, small air gaps can exist between the electrodes and the electro-optic element, such as may be caused by the ordinary roughness of the mating surfaces of the electrodes and the electro-optic element, by defects in those surfaces, and by dust or other contaminant particles which may be entrapped therebetween. Such air gaps can greatly diminish the strength of the localized electric bulk or fringe fields created within the electro-optic element since they form series capacitances between adjacent electrodes and the electro-optic element. The relative voltage drops across the air gaps are approximately proportional to the thickness of the air gaps and the dielectric constant of the material of the electro-optic element. Actual simulation tests demonstrate that if the width of the electrodes is 5 microns and the separation between adjacent electrodes is 5 microns, a full frequency, modulation pattern would be only 18% of its "electrode in contact with the electro-optic element" value when the air gaps are 0.5 microns across. Accordingly, it is desirable to eliminate gaps of low dielectric constant material between the electrodes and the electro-optic element of proximity coupled electro-optic devices.

In accordance with the invention, an improved proximity coupled electro-optic device is provided by depositing on the mating surface of the electro-optic element of the device a pattern of conductors which are aligned in the same, or substantially the same, direction as the electrodes of the device, and which have a period equal to or less than the maximum width of the electrodes. When the period of the conductor pattern is less than the maximum width of the electrodes more than one conductor is situated adjacent each electrode, thereby permitting increased directional alignment tolerances between the conductors and the electrodes. Directional alignment tolerances are further increased by segmenting the conductors.

Still other features and advantages of this invention will become apparent when the following detailed description is read in conjunction with the attached drawings, in which:

FIGS. 8 and 8(a) are enlarged side views of the conductor-electrode patterns of a portion of the TIR light valve in accordance with the invention.

While the invention is described in some detail hereinbelow with reference to certain illustrated embodiments, it is to be understood that there is no intent to limit it to those embodiments. On the contrary, the aim is to cover all modifications, alternatives and equivalents falling within the spirit and scope of the invention as defined by the appended claims.

Figure 1:
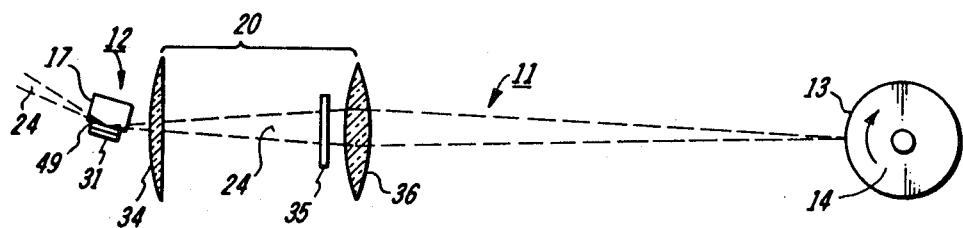
FIG. 1 is a schematic side view of an electro-optic line printer including a proximity coupled TIR multi-gate light valve which embodies the present invention.
Figure 2:
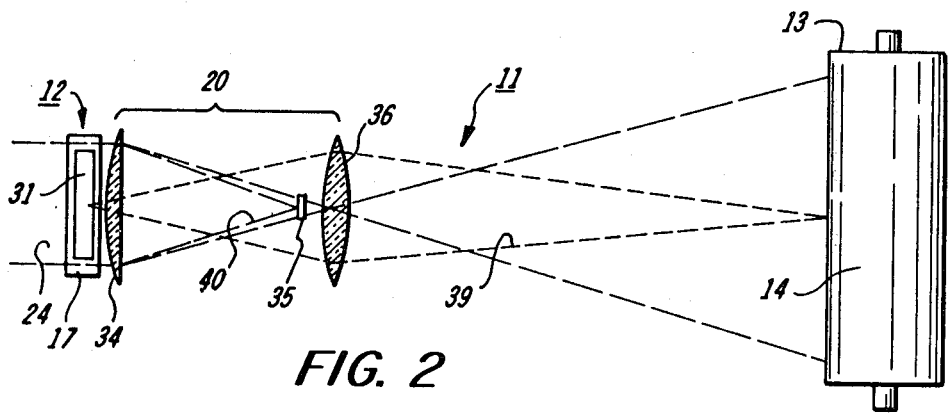
FIG. 2 is a schematic bottom plan view of the electro-optic line printer shown in FIG. 1.

Turning now to the drawings, and at this point especially to FIGS. 1 and 2, there is shown an electro-optic line printer 11 comprising a multi-gate light valve 12 for exposing a photosensitive recording medium 13 in an image configuration. The recording medium 13 is depicted as being a photoconductively coated xerographic drum 14 which is rotated (by means not shown) in the direction of the arrow. It nevertheless will be evident that there are other xerographic and non-xerographic recording media that could be used, including photoconductively coated xerographic belts and plates, as well as photosensitive film and coated paper in web or cut sheet stock form. The recording medium 13 should, therefore, be visualized in the generalized case as being a photosensitive medium which is exposed in an image configuration while advancing in a cross line or line pitch direction relative to the light valve 12.

Figure 3:
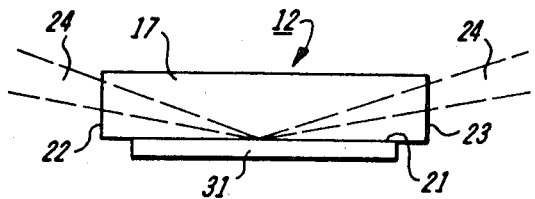
FIG. 3 is an enlarged side view of a TIR light valve for the electro-optic line printer of FIGS. 1 and 2.
Figure 4:
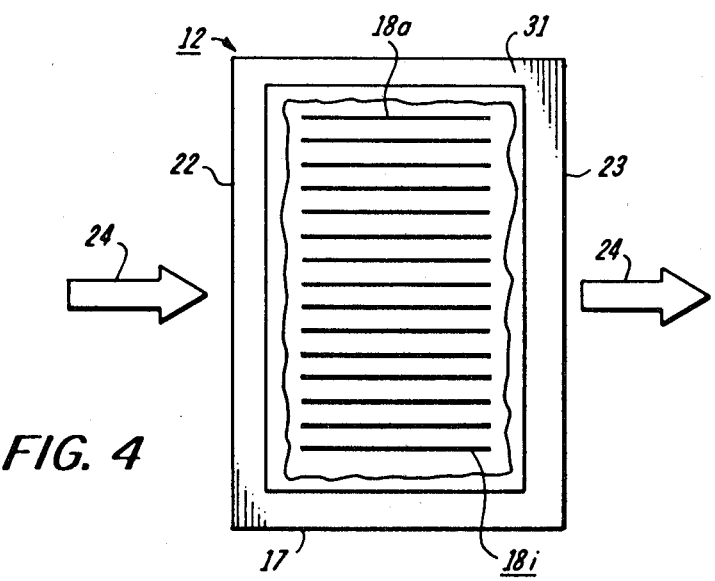
FIG. 4 is an enlarged cutaway bottom view of the TIR light valve of FIG. 3 showing a pattern of individually addressable electrodes.

As shown in FIGS. 3 and 4, the light valve 12 includes an electro-optic element 17 and a plurality of individually addressable electrodes 18a-18i. For a total internal reflection (TIR) mode of operation as illustrated, the electro-optic element 17 typically is a y cut crystal of, say, LiNbO$_3$ having an optically polished reflecting surface 21 which is integral with and disposed between optically polished input and output faces 22 and 23, respectively. The electrodes 18a-18i are coupled to the electro-optic element 17 adjacent the reflecting surface 21 and are distributed across essentially the full width thereof. Typically, the electrodes 18a-18i are 1-30 microns wide and are on centers which are more or less equidistantly separated to provide a generally uniform interelectrode gap spacing of 1-30 microns. In this particular embodiment the electrodes 18a-18i extend generally parallel to the optical axis of the electro-optic element 17 and have projections of substantial length along that axis. Alternatively, the electrodes 18a-18i could be aligned at the so-called Bragg angle relative to the optical axis of the electro-optic element 17. As will be appreciated, if the electrodes 18a-18i are aligned parallel to the optical axis of the electro-optic element 17, the light valve 12 will produce a diffraction pattern which is symmetrical about the zero order diffraction component. If, on the other hand, the electrodes 18a-18i are at the Bragg angle relative to the optical axis of the electro-optic element 17, the light valve 12 will produce an asymmetrical diffraction pattern.

Briefly reviewing the operation of the line printer 11 depicted in FIGS. 1-4, a sheet-like collimated beam of light 24 from a suitable source, such as a laser (not shown), is transmitted through the input face 22 of the electro-optic element 17 at a grazing angle of incidence relative to the reflecting surface 21. The light beam 24 is brought to a wedge shaped focus (by means not shown) at approximately the center line of the reflecting surface 21 and is totally internally reflected therefrom for subsequent transmission through the output face 23. As will be seen, the light beam 24 illuminates substantially the full width of the electro-optic element 17 and is phase front modulated while passing therethrough in accordance with the encoded data samples applied to the electrodes 18a-18i.

Figure 5:
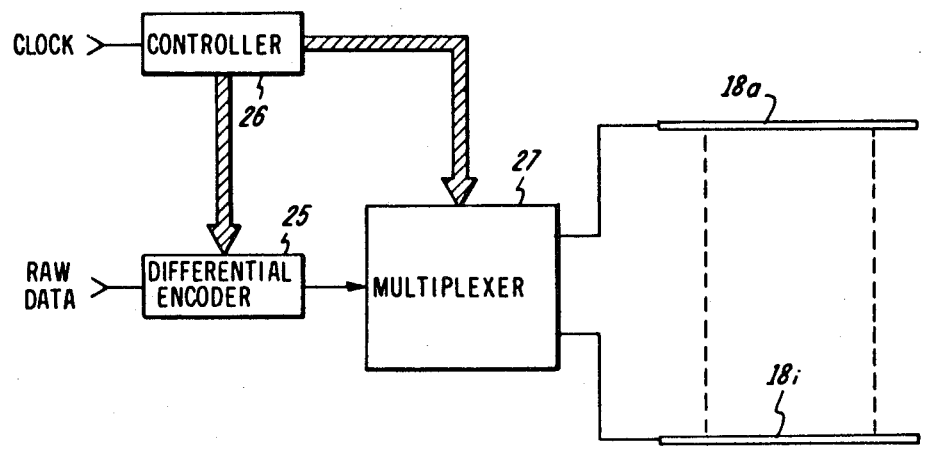
FIG. 5 is a simplified block diagram of a system for applying encoded serial input data to the individually addressable electrodes of the electrode pattern shown in FIG. 4.

More particularly, as shown in FIG. 5, serial input data samples, which represent picture elements for successive lines of an image, are applied to a differential encoder 25 at a predetermined data rate. The encoder 25 differentially encodes the input samples on a line-by-line basis in response to control signals from a controller 26, and a multiplexer 27 ripples the encoded data samples onto the electrodes 18a-18i at a ripple rate which is matched to the data rate in response to further control signals from the controller 26. The input data may, of course, be buffered (by means not shown) to match the input data rate to any desired ripple rate. Additionally, the input data may be processed (by means also not shown) upstream of the encoder 25 for text editing, formatting or other purposes, provided that the data samples for the ultimate image are applied to the encoder 25 in adjacent picture element sequence.

Figure 6:
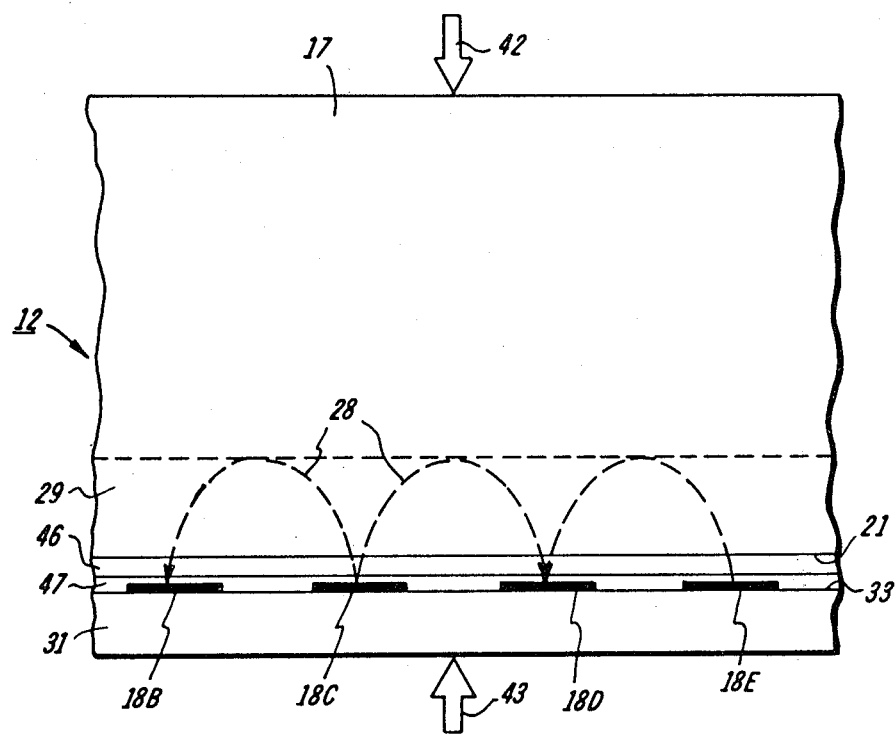
FIG. 6 is an enlarged and fragmentary sectional view of the TIR light valve shown in FIG. 3 to better illustrate the proximity coupling of the electrodes to the electro-optic element and the interaction which occurs between the light beam and the electric fringe fields within the interaction region of the electro-optic element.

The encoded data samples applied to the electrodes 18a-18i produce potential differences or voltage drops between adjacent pairs of electrodes. Referring to FIG. 6, the electrode to electrode voltage drops create localized fringe fields 28 within an interaction region 29 of the electro-optic element 17, and the fringe fields 28 cause localized variations in the refractive index of the electro-optic element 17 widthwise of the interaction region 29. The voltage drop between any adjacent pair of electrodes, such as 18b and 18c or 18c and 18d, determines the refractive index for the portion of the interaction region 29 which bridges between those two electrodes. Hence, the refractive index variations within the interaction region 29 faithfully represent the input data samples appearing on the electrodes 18a-18i in encoded form at any given point in time. It therefore follows that the phase front of the light beam 24 (FIG. 3) is sequentially spatially modulated in accordance with the data samples for successive lines of the image as the light beam 24 passes through the interaction region 27 of the electro-optic element 17.

Referring for a moment to FIGS. 1 and 2, to expose the recording medium 13 in an image configuration, there suitably are Schlieren central dark field imaging optics 31 which are optically aligned between the electro-optic element 17 and the recording medium 13 for imaging the light beam 24 onto the recording medium 13. The imaging optics 31 convert the spatial phase front modulation of the light beam 24 into a correspondingly modulated intensity profile and provide any magnification that is required to obtain an image of a desired width. To accomplish that, the illustrated imaging optics 31 includes a field lens 34 for focusing the zero order diffraction components 32 of the phase front modulated light beam 24 onto a central stop 35 and an imaging lens 36 for imaging the higher order diffraction components onto the recording medium 13; i.e., the image plane for the light valve 12. The field lens 34 is optically aligned between the electro-optic element 17 and the stop 34 so that substantially all of the zero order components 32 of the light beam 24 are blocked by the stop 35. The higher order diffraction components of the light beam 24 scatter around the stop 35 and are collected by the imaging lens 36 which, in turn, causes them to fall onto the light valve image plane defined by the recording medium 13. Of course, other p-sensitive readout optics could be used to convert the phase front or polarization modulated light beam provided by the electro-optic element 17 into a light beam having a correspondingly modulated intensity profile.

To summarize, as indicated in FIG. 2 by the broken lines 39, each neighboring pair of electrodes, such as 18$b$ and 18$c$ (FIG. 6), cooperates with the electro-optic element 17 and with the p-sensitive readout optics 31 to effectively define a local modulator for creating a picture element at a unique, spatially predetermined position along each line of the image. Accordingly, the number of electrodes 18$a$–18$i$ determines the number of picture elements that can be printed per line of the image. Moreover, by sequentially applying successive sets of encoded data samples to the electrodes 18$a$–18$i$ while the recording medium 13 is advancing in a cross line direction relative to the light valve 12, successive lines of the image are printed.

Figure 7:
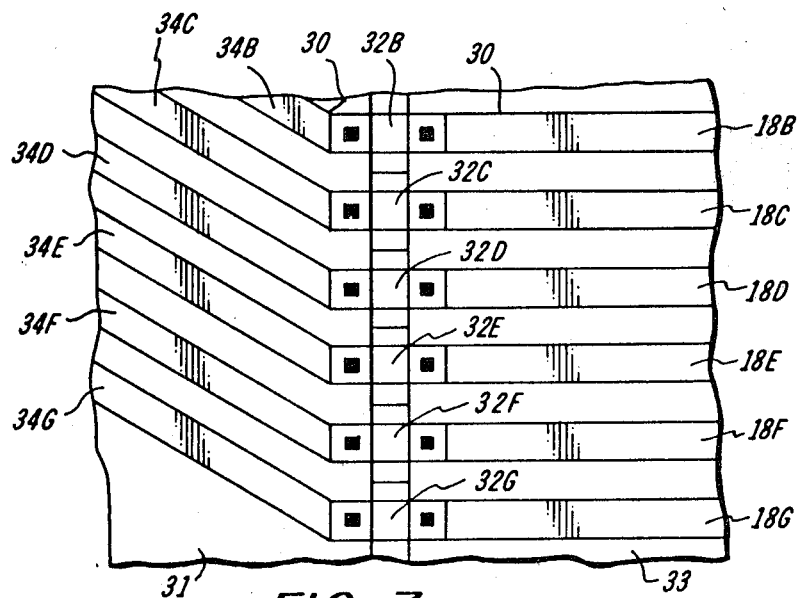
FIG. 7 is an enlarged and fragmentary schematic plan view of the electrode pattern of FIG. 4 as embodied on a silicon integrated circuit in accordance with this invention.

As best shown in FIG. 7, the electrodes 18$a$–18$i$ are preferably defined by a suitably patterned, electrically conductive layer, generally indicated by 30, which is deposited on and is a part of an electrical integrated circuit 31, such as a LSI (large scale integrated) silicon integrated circuit, to make electrical contact to the integrated drive electronics 32$b$–32$g$. For example, as illustrated, the multiplexer 27 is embodied in the integrated circuit 31, and the electrodes 18$a$–18$i$ are an extension of the metalization or polysilicon layer 30 which is used to make electrical connections to the output transfer gates or pass transistors 32$b$–32$g$ and other individual components (not shown) of the multiplexer 27. The pass transistors 32$b$–32$g$ and the other components of the multiplexer 27 are formed on the integrated circuit 31 by using more or less standard LSI component fabrication techniques, and the metalization or polysilicon layer 30 is thereafter deposited on the outer surface 33 of the integrated circuit 31. An etching process or the like is then used to pattern the electrically conductive layer 30 as required to provide electrically independent connections to the electrically independent components of the multiplexer 27 and to form the electrically independent electrodes 18$a$–18$i$ (only the electrodes 18$b$–18$g$ can be seen in FIG. 7). Thus, the data transfer lines 34$b$–34$g$ for the pass transistors 32$b$–32$g$ are defined in the metalization or polysilicon layer 30 by the same etching process which is used to define the electrodes 18$a$–18$i$.

Referring again to FIG. 6, the electrodes 18$a$–18$i$ are proximity coupled to the electro-optic element 17. To that end, a clamp, which is schematically represented by the arrows 42 and 43, is engaged with the electro-optic element 17 and with the silicon integrated circuit 31 to urge the electrodes 18$a$–18$i$ into close contact with the reflecting surface 23 of the electro-optic element 17. Alternatively, the integrated circuit 31 could be bonded to the electro-optic element 17 by an adhesive or by suction.

Even though the electrodes 18$a$–18$i$ are urged toward contact with electro-optic element 17, undesired small air gaps may exist between the electro-optic element 17 and one or more of the electrodes 18$a$–18$i$. As noted, such air gaps may greatly diminish the magnitude of the localized fringe fields because the dielectric constant of air (approximately 1) is much less than the dielectric constant of the material of the electro-optic element 17 (approximately 30 for $LiNbO_3$).

In accordance with the invention, as shown in FIG. 8, the air gap problem is overcome by providing a pattern of individual, parallel conductors 44$a$–44$z$ on the mating surface 17$a$ of the electro-optic element 17. Conductors 44$a$–44$z$ are intimately bonded in a conventional manner to the surface 17$a$ and are distributed in non-overlapping relationship widthwise of the electro-optic element (i.e. orthogonally relative to its optical axis), typically on equidistantly spaced centers so that there is a generally uniform interconductor spacing. If the electrodes 18$a$–18$i$ have a longitudinal direction aligned generally parallel to the optical axis of the electro-optic element 17, the conductors 44$a$–44$z$ will also have that longitudinal alignment. Alternatively, if the electrodes 18$a$–18$i$ have a longitudinal direction aligned at the Bragg angle relative to the optical axis of the electro-optic element 17, the conductors 44$a$–44$z$ will also have that longitudinal alignment.

The conductors 44 bonded the electro-optic element 17 can have the same width and period as the electrodes 18$a$–18$i$. However, in that configuration of the invention, each conductor would have to be in substantial alignment with each electrode since any significant skewing between conductors and electrodes could cause shorting of adjacent electrodes or, at a minimum, modification of the effective width of the electrodes. To protect against such shorting or width modification, the period of the conductors 44 preferably is set at less than the width of the individual electrodes 18$a$–18$i$. For example, as shown in FIG. 8, the conductors 44 have a period that is one-fifth (1/5) the width of the individual electrodes 18$a$–18$i$, that is, if the electrodes are five microns wide than the period of the conductors 44 would be one micron and each conductor could be 0.5 microns wide. With the disclosed conductor configuration, contact between each electrode 18$a$–18$i$ and one of the conductors 44 is all that is necessary to provide full electrode to electrode voltage drops, and hence full strength fringe fields can be achieved with less critical conductor-electrode alignment tolerances. In the conductor pattern example of FIG. 8$a$, the period of the conductors is one-third (⅓) the width of the individual electrodes 18$a$–18$i$, which provides satisfactory operation but, due to the increased period of the conductors, requires more critical conductor-electrode alignment tolerances than the exemplary pattern of FIG. 8. Thus, as a general rule, the criticality of the conductor-electrode alignment decreases as the period of the conductors decreases.

Figure 9:
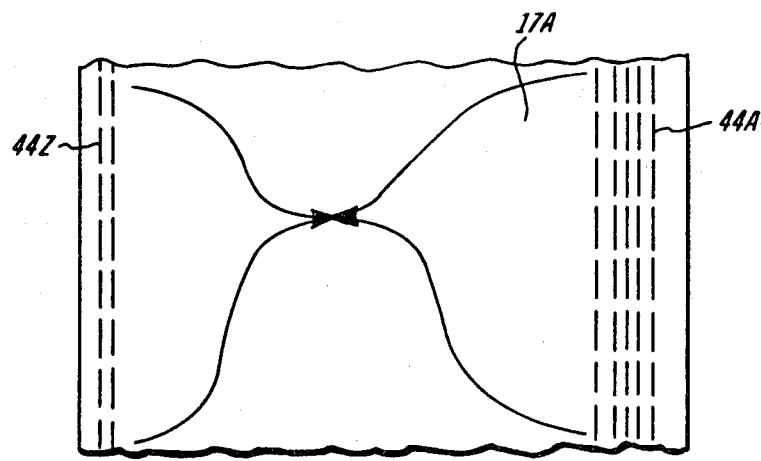
FIG. 9 is an enlarged bottom view of a portion of the segmented conductor pattern in accordance with the invention.

Even though a significant reduction in the period of the conductors will make conductor-electrode alignment tolerances less critical, such alignment tolerances are sill very small. For example, if the electrodes 18a-18i are 2 millimeters long and the spacing between electrodes is 5 microns, then the critical angle between the conductor pattern and the electrodes that will prevent shorting is
$\tan^{-1}$(5 microns/2 millimeters), or 0.14°, which is a formidable process parameter to achieve. The critical angle is increased significantly, in accordance with the invention, by sectioning or dividing each of the conductors 44 into a plurality of component segments, as shown in FIG. 9. As an example, assuming that an alignment angle of 1 degree (approximately 20 mils/inch) between the conductors and the electrodes is a practical process parameter, and that the effective width of the electrodes is not increased by conductor overhang by more than 1/5 the width of the electrodes, than the conductor segment lengths, $L_S$, would be:

$$L_S = \frac{(1/5)(5 \text{ microns})}{\tan 1°} = 57 \text{ microns}.$$

In the foregoing discussion, it was assumed that the material(s) of the conductors and the electrodes had equal, or substantially equal, hardness. For example, the electrodes and the conductors could be made of aluminum, both shaped by conventional photolithographic-etching techniques. By making the conductors of a softer material than the electrodes, for example, gold as the conductor material and aluminum as the electrode material, some high frequency mating surface conformity problems are overcome.

Placing a great number of metal conductors 44 on the surface 17a of the electro-optic element 17 may cause frustration of the total internal reflection (TIR) operating mode of the devices described. To reduce or eliminate such TIR frustration, a thin insulating layer may be placed between the conductors 44 and the surface 17a.

What is claimed is:

1. In an electro-optic device including an electro-optic element, a plurality of electrodes for applying encoded data samples, and means for urging the plurality of electrodes toward a surface of the electro-optic element, the improvement comprising:
 a plurality of conductors applied to said surface of said electro-optic element, said conductors being aligned in substantially the same direction as said electrodes.
2. The improvement of claim 1 wherein the period of said conductors is substantially equal to the width of the individual conductors.
3. The improvement of claim 1 wherein the period of said conductors is substantially less than the width of the individual conductors.
4. The improvement of claim 1 wherein said conductors are segmented.
5. The improvement of claim 2 in which said conductors are segmented.
6. The improvement of claim 3 in which said conductors are segmented.

* * * * *